US012273983B2

(12) United States Patent
Honary et al.

(10) Patent No.: US 12,273,983 B2
(45) Date of Patent: Apr. 8, 2025

(54) PROCESS AND APPARATUS FOR FLOWABLE PRODUCTS

(71) Applicant: WAVEtek Process Technology, LLC, Grundy Center, IA (US)

(72) Inventors: Lou A. T. Honary, Cedar Falls, IA (US); Saeed Zaher Soleimani, Cedar Falls, IA (US); Timothy Scheurs, Amana, IA (US); Trevor Ericson, Cedar Rapids, IA (US)

(73) Assignee: WAVETEK PROCESS TECHNOLOGY, LLC, Grundy Center, IA (US)

( * ) Notice: Subject to any disclaimer, the term of this patent is extended or adjusted under 35 U.S.C. 154(b) by 0 days.

(21) Appl. No.: 16/783,699

(22) Filed: Feb. 6, 2020

(65) Prior Publication Data

US 2020/0253007 A1 Aug. 6, 2020

Related U.S. Application Data

(60) Provisional application No. 62/801,860, filed on Feb. 6, 2019.

(51) Int. Cl.
*H05B 6/70* (2006.01)

(52) U.S. Cl.
CPC .................................... *H05B 6/707* (2013.01)

(58) Field of Classification Search
CPC .......... H05B 6/64; H05B 6/6402; H05B 6/70; H05B 6/701; H05B 6/707; H05B 6/80; H05B 6/802; H05B 2206/04; H05B 2206/045
See application file for complete search history.

(56) References Cited

U.S. PATENT DOCUMENTS

| | | | | |
|---|---|---|---|---|
| 6,120,741 | A * | 9/2000 | Jacquault | H05B 6/806 422/199 |
| 2009/0038931 | A1 * | 2/2009 | Cereceda Balic | H05B 6/806 202/170 |
| 2010/0270291 | A1 * | 10/2010 | Kotzian | H05B 6/701 219/690 |
| 2015/0101922 | A1 * | 4/2015 | Ramer | B01D 5/0003 203/50 |

* cited by examiner

*Primary Examiner* — Dana Ross
*Assistant Examiner* — Joe E Mills, Jr.
(74) *Attorney, Agent, or Firm* — SHUTTLEWORTH & INGERSOLL, PLC; Brett D. Papendick

(57) ABSTRACT

A process and apparatus for heating a flowable product. The flowable product is introduced into a vessel or chamber and then heated by use of microwaves. The microwaves are generated by a microwave transmitter and introduced into the vessel at or near a bottom of the vessel via a waveguide. The introduction of microwaves near or at the bottom of the vessel allows mixing of the flowable product as the flowable product is heated.

12 Claims, 3 Drawing Sheets

PROCESS AND APPARATUS FOR FLOWABLE PRODUCTS

CROSS-REFERENCE TO RELATED APPLICATIONS

The present application claims priority to provisional patent application 62/801,860 which was filed on Feb. 6, 2019, and is hereby expressly incorporated by reference in its entirety.

BACKGROUND OF THE INVENTION

The method of heating for flowable products including industrial liquids, food products, or viscous products such as pastes and greases has remained largely unchanged for several decades. Recent attempts at modifying the method have utilized microwaves for heating flowable products and have brought about a significant new approach to process heating for these types of flowables.

The present invention provides a process, and corresponding apparatus and system for manufacturing flowable products ranging in low viscosity liquids to very viscous semi-fluids such as pastes and greases. An earlier patent by Honary and James (U.S. Pat. No. 8,962,542), incorporated microwaves to metallic vessels for processing grease. While application of microwaves to products inside a metallic vessel has been considered a breakthrough in processing technology, this method of application presents a number of distinct shortcomings of the prior art as discussed below.

Flowable products heated by microwaves entering from the top of a vessel or container require movement, otherwise overheating of top layers of the flowable products can result. This characteristic is exacerbated if the flowable product is viscous. Accordingly, it becomes especially critical for highly vicious flowable products to have some type of circulation or mechanical mixing. However, the additions of circulation and mechanical mixing means still do not fully mix the hot top layer of products in the vessels. Typically, the movement is provided by the addition of pumps to help circulate the products which can be add expense to the processes of heating and circulating flowable products.

Furthermore, at high temperatures that are close to the flash point of the particular product, arcing can occur within the vessel holding the products. Any arcing inside the vessel could have the potential to ignite the particular product and create an explosion.

The application of microwaves to flowable products has been most successful when such flowable products are di-polar in nature. Examples of these types of flowable products are vegetable oils and renewable products. However, for mineral (petroleum) oil-based products the amount of microwave reflection increases resulting in a slower heating of the product.

When microwaves are applied from the top of vessels, vigorous mixing is required because the top layer of product would become superheated as there is little to no convective flow within the vessel.

SUMMARY OF THE INVENTION

The present invention addresses the shortcomings of the current state of technology by applying microwaves from the bottom of the vessel. The positioning of the waveguide relative to the vessel requires special arrangements whereby the waveguides are isolated from the product by a microwave transparent barrier. Materials such as glass, ceramic, TEFLON® (polytetrafluoroethylene), PYREX® (borosilicate glass), and other industrially-produced or natural materials including diamond, sapphire and the like can be incorporated as the microwave transparent barrier. A selected number of materials have been tested to determine their ability to conduct microwaves without reflecting some of the waves back into the wave generators and wave transmitters. Additionally, the microwave transparent barrier used in this process must be able to handle the high temperatures of the product, be compatible with vessel's materials in terms of expansion and contraction rates, and handle pressures applied to it via the weight of the product. Furthermore, for vessels that require pressurization or operation under vacuum, the microwave transparent barrier must be able to maintain its integrity and sealing property to prevent the product from entering the waveguides.

The present invention also overcomes the limitations of the existing art of using microwaves with metallic vessels for heating of liquids and semi-solid products. By using a preferred microwave-transparent barrier in the waveguide at the point of connection to the vessel, microwaves can be applied to any part of the vessel. When applied from the sides or bottom and below the surface of the product many of the limitations of the current state of the art are eliminated. Applying the microwaves from the bottom of vessels can allow for the possible use of open top vessels and reduce the need for special containment systems on top of the vessel.

In cases where products are di-polar that efficiently absorb the applied microwaves with little or no energy reflection, the vessels could be manufactured without special microwave leak proof doors and without the need for arc detectors and other components required in the current microwave based vessels.

The proposed design shown in FIG. 3 allows for the use of the technology for heating liquids and viscous products from the bottom. The use of various microwave transparent barriers at the end of the waveguide requires special materials, as well as designs to prevent product leakage into the waveguide. Incorporation of different materials for the microwave transparent barrier is based on the type of products to be heated. Again, those materials can include, fibrous plates with and without various coatings, ceramic, TEFLON® (polytetrafluoroethylene), porcelain, glass, PYREX® (borosilicate glass), coated and uncoated materials, industrial materials, and natural materials such as alumina diamond and sapphire.

The bottom entering microwaves can be applied to the sides and the bottoms of the vessels at different distances from the bottom of the tank. Furthermore, product circulation and scrape mixing can be accomplished by conventional means including pump circulation, propeller agitation, and scrape surface mixing. The current design allows for a microwave transparent barrier that is flush with the inside surface of the vessel to allow for the use of scrape surface mixer arms.

Both the microwave transparent barrier and the waveguide require modifications to ensure the microwave transparent barriers are securely held in place and can expand and contract with the vessel as the product is heated. The waveguide requires special machining, which would be a deviation from the standard design and incorporates recesses to house the barrier and provide proper sealing for the products. The recesses would also allow for expansion and contraction of the microwave transparent barrier and utilizes microwave-safe sealants. Furthermore, the addition of controls and structures to allow for increasing or decreasing of the tank pressure to assist with filling, mixing, or emptying the tank or vessel can be added.

Incorporation of this design can allow for retrofitting of existing vessels. The design could be added to systems having an existing specific circulation design in a way to complement the microwave entry from the bottom of vessels.

DETAILED DESCRIPTION OF THE INVENTION

Figure 1:
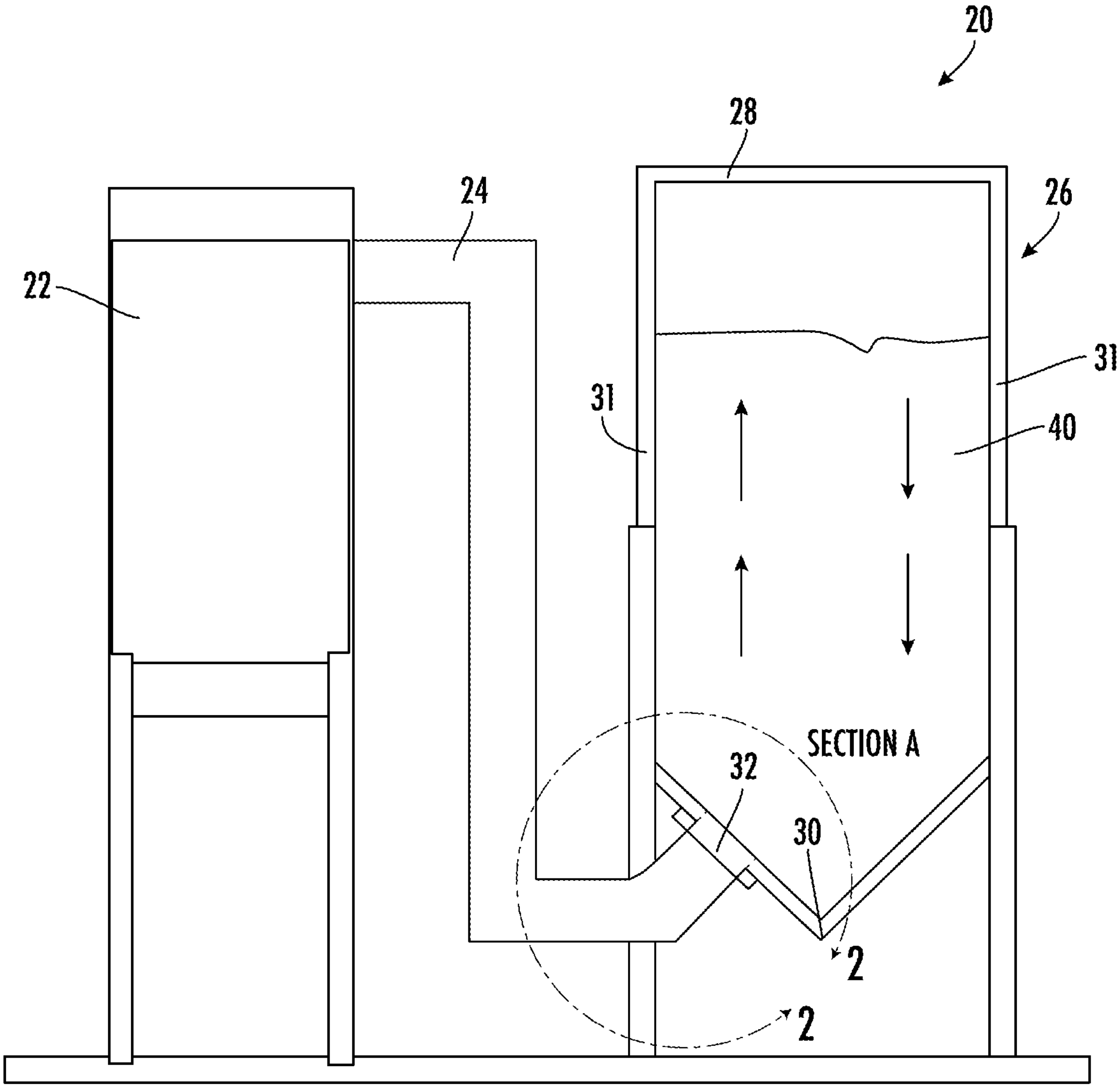
FIG. 1 is a front view of the apparatus.
Figure 2:
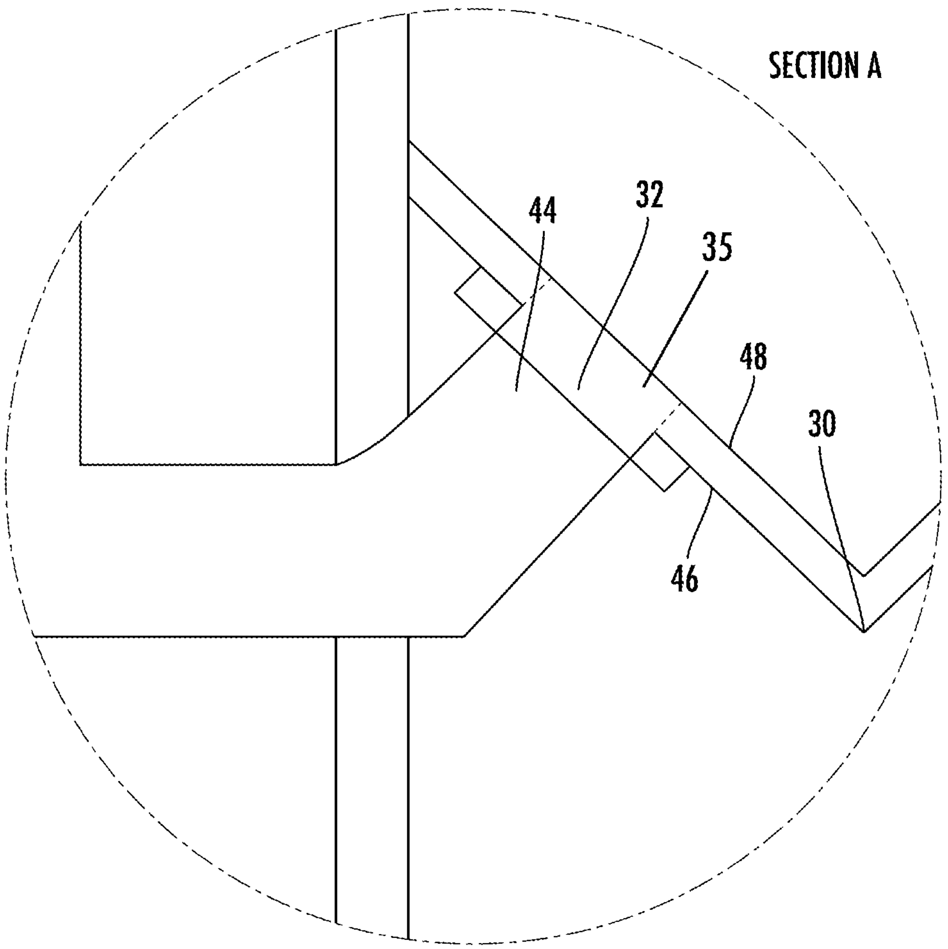
FIG. 2 is a front view showing the detail of the waveguide, microwave transparent barrier, and the connection to the vessel.
Figure 3:
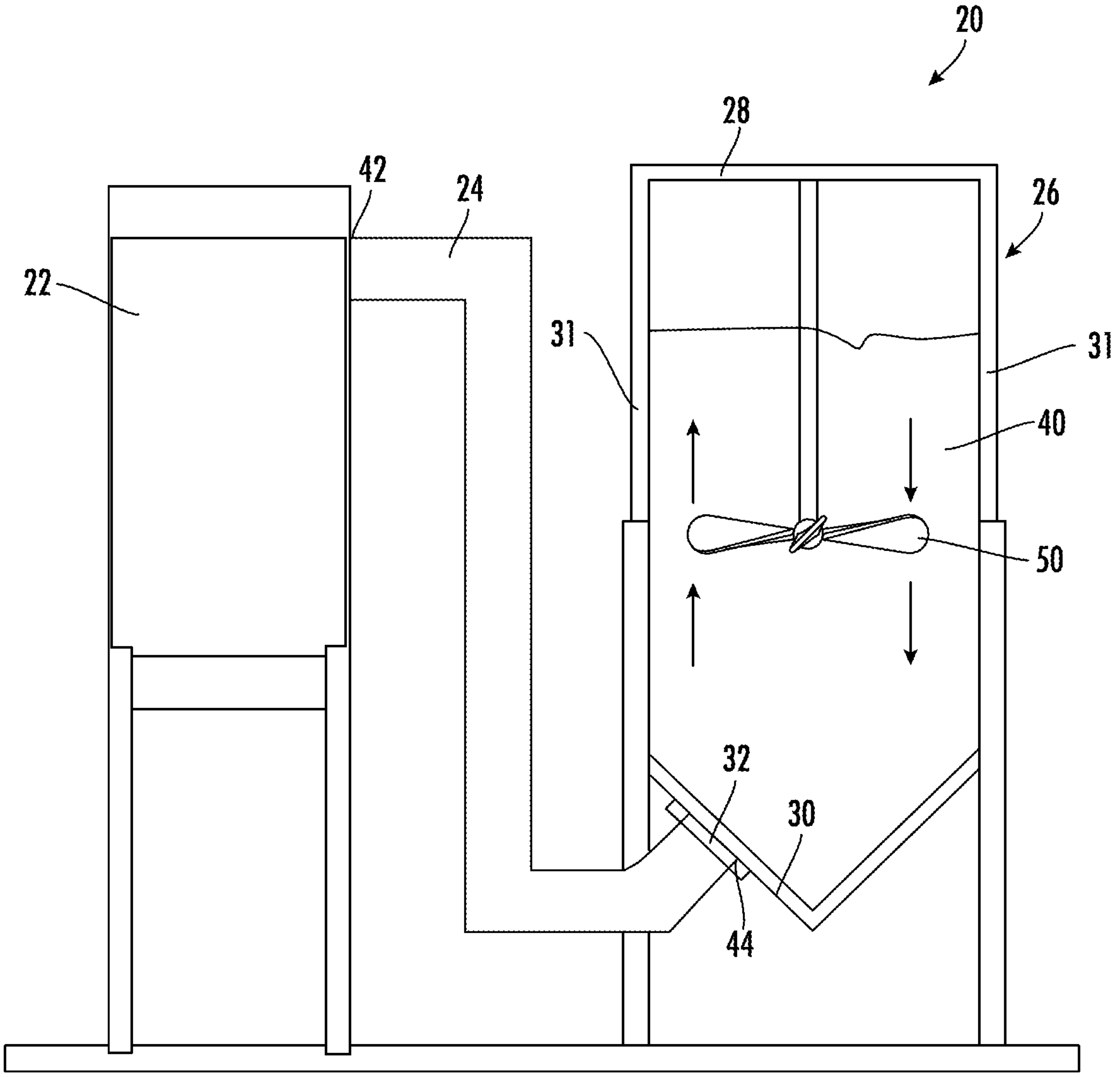
FIG. 3 is a front view showing the apparatus with mixing paddles.

Now referring to the figures, FIGS. 1-3 show an apparatus 20 for heating a flowable product 40 or material. The apparatus 20 includes a microwave transmitter 22 or microwave generator for generating microwaves. The microwaves are directed out of the microwave transmitter 22 toward a waveguide 24. The waveguide 24 is made of material that contains the microwaves within the waveguide 24 and directs the microwaves toward a vessel 26. The waveguide 24 is connected to the vessel 26 at or near a bottom 30. Depending on the shape of the vessel 26, the connection of the waveguide 24 can be on a sidewall 31 or at the bottom 30. Additionally, the ability of the apparatus 20 to heat the flowable product 40 from the bottom 30 or substantially near the bottom 30 allows the higher temperature flowable product 40 to rise and the lower temperature flowable product 40 to fall toward the bottom 30 of the vessel 26 as shown in FIG. 1 with the arrows.

A point of entry 35 of the waveguide 24 on the vessel 26 is substantially near the bottom 30 of the vessel 26. At the point of entry 35, a microwave transparent barrier 32 allows the microwaves to exit the waveguide 24 and enter the vessel 26 holding the flowable product or material 40. In the preferred embodiment, the waveguide 24 and the microwave transparent barrier 32 are flush with the vessel 26 and do not enter the cavity created by the vessel 26.

To further describe the point of entry 35, FIG. 2 shows a detailed view of the waveguide 24 and the vessel 26. The waveguide 24 has a first end 42 and a second end 44 wherein the first end 42 is connected to the microwave transmitter 22 and the second end 44 is attached to the vessel 26. The vessel 26 has sidewalls 31 with an exterior portion 46 and an interior portion 48. The second end 44 does not extend pass the interior portion 48 of the sidewall 31. It is to be understood that if the bottom 30 is flat, the second end 44 would not extend into an interior portion of the bottom. As the waveguide 24 and the microwave transparent barrier 32 are either flush with or recessed in the sidewall 31 or bottom 30, mixing paddles 50 as shown in FIG. 3 can be added to the apparatus 20 to assist in mixing the contents of the vessel 26.

The apparatus 20 can be added to existing systems and the apparatus 20 can replace certain aspects of existing systems. Furthermore, the apparatus 20 allows existing systems to become less complex as circulation occurs within the apparatus 20 without the requirement of pumps and other circulatory assisting devices. While the vessel 26 is shown with a top 28, the invention allows a vessel to be used without a top.

Having thus described the invention in connection with the several embodiments thereof, it will be evident to those skilled in the art that various revisions can be made to the several embodiments described herein without departing from the spirit and scope of the invention. It is my intention, however, that all such revisions and modifications that are evident to those skilled in the art will be included with in the scope of the following claims. Any elements of any embodiments disclosed herein can be used in combination with any elements of other embodiments disclosed herein in any manner to create different embodiments.

What is claimed is:

1. An apparatus for heating a flowable material with microwave energy, comprising:
- a microwave transmitter;
- a waveguide;
- a microwave transparent barrier;
- a metallic vessel;
- the waveguide connecting the microwave transmitter to the vessel;
- the vessel having sidewalls and a bottom;
- the sidewalls and the bottom configured to directly contact the flowable material;
- the waveguide has a point of entry on the vessel at the bottom of the vessel;
- wherein microwave energy from the microwave transmitter only enters the vessel at the bottom of the vessel;
- the microwave transparent barrier at the bottom of the vessel;
- wherein the microwave energy is configured to enter the vessel at only the bottom and heat the flowable material at the bottom leading to convection as the flowable material at or near the bottom of the vessel rises and the flowable material not at the bottom sinks.

2. The apparatus for heating a flowable material of claim 1, wherein:
- the waveguide has a first end and a second end;
- the vessel has an exterior wall and an interior wall;
- the second end of the waveguide does not extend passed the interior wall into an interior of the vessel.

3. The apparatus for heating a flowable material of claim 1, wherein:
- the apparatus is configured to heat a dipolar material.

4. The apparatus for heating a flowable material of claim 3, wherein:
- an arc detector is not needed.

5. The apparatus for heating a flowable material of claim 1, wherein:
- the microwave transparent barrier is one of glass, ceramic, polytetrafluoroethylene, borosilicate glass, alumina diamond or sapphire.

6. The apparatus for heating a flowable material of claim 1, wherein:
- a plurality of waveguides is utilized to transport the microwaves to the vessel.

7. The apparatus for heating a flowable material of claim 1, further comprising:
- mixing paddles for mixing the flowable material inside the vessel.

8. An apparatus for heating a flowable material with microwave energy, comprising:
- a microwave transmitter;
- a waveguide;
- a microwave transparent barrier;

a metallic vessel;

the waveguide connecting the microwave transmitter to the vessel;

the vessel having sidewalls and a bottom;

the sidewalls and the bottom configured to directly contact the flowable material;

the waveguide has a point of entry on the vessel at the bottom of the vessel;

wherein the microwave energy only enters at the bottom of the vessel;

the microwave transparent barrier at the bottom of the vessel;

the waveguide has a first end and a second end;

the vessel has an exterior wall and an interior wall;

the second end of the waveguide does not extend passed the interior wall into an interior of the vessel;

the microwave transparent barrier is one of glass, ceramic, polytetrafluoroethylene, borosilicate glass, alumina diamond or sapphire.

9. The apparatus for heating a flowable material of claim 8, wherein:

the apparatus is configured to heat a dipolar material.

10. The apparatus for heating a flowable material of claim 8, wherein:

an arc detector is not needed.

11. The apparatus for heating a flowable material of claim 8, wherein:

a plurality of waveguides is utilized to transport the microwaves to the vessel.

12. The apparatus for heating a flowable material of claim 8, further comprising:

mixing paddles for mixing the flowable material inside the vessel.

* * * * *